United States Patent
Hundt et al.

(10) Patent No.: US 6,993,750 B2
(45) Date of Patent: Jan. 31, 2006

(54) DYNAMIC REGISTRATION OF DYNAMICALLY GENERATED CODE AND CORRESPONDING UNWIND INFORMATION

(75) Inventors: Robert Hundt, Santa Clara, CA (US); Muralitharan Vijayasundaram, Santa Clara, CA (US); Cary A. Coutant, Saratoga, CA (US); Kannan Narasimhan, Allen, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 602 days.

(21) Appl. No.: 10/016,955

(22) Filed: Dec. 13, 2001

(65) Prior Publication Data

US 2003/0115582 A1    Jun. 19, 2003

(51) Int. Cl.
*G06F 9/44*        (2006.01)

(52) U.S. Cl. .................. 717/130; 717/127; 717/131; 717/158; 719/328

(58) Field of Classification Search ........ 717/124–167, 717/106–108, 114–116, 118, 120–121; 719/310, 719/328, 315–316, 330–332
See application file for complete search history.

(56) References Cited

U.S. PATENT DOCUMENTS

| 6,106,571 | A  | * | 8/2000  | Maxwell ................... 717/131 |
| 6,253,317 | B1 | * | 6/2001  | Knapp et al. ............. 712/244 |
| 6,332,168 | B1 | * | 12/2001 | House et al. ............. 719/331 |
| 6,470,493 | B1 | * | 10/2002 | Smith et al. ............. 717/130 |
| 2003/0055936 | A1 | * | 3/2003 | Zhang et al. ............. 709/223 |

OTHER PUBLICATIONS

Hundt, HP Caliper—An Architecture for Performance Analysis Tool, Oct. 2000, Hewlett-Packard Company.*
Cierniak-Lueh-Stichnoth, Practicing JUDO: JAVA Under Dynamic Optimizations, Jun. 2000, ACM 1-58113-199-2/00/0006.*

* cited by examiner

*Primary Examiner*—Antony Nguyen-Ba (57) ABSTRACT

A method and system for enabling the registration of dynamically generated code and corresponding unwind information. In one embodiment, the present invention creates a module which includes data related to dynamically generated code and corresponding unwind information. The present embodiment also provides an application program interface which allows the data to be registered such that dynamic registration of the dynamically generated code and the corresponding unwind information is enabled.

33 Claims, 8 Drawing Sheets

200

START

↓

CREATING A MODULE WHICH INCLUDES DATA RELATED TO DYNAMICALLY GENERATED CODE AND CORRESPONDING UNWIND INFORMATION
202

↓

PROVIDING AN APPLICATION PROGRAM INTERFACE WHICH ALLOWS THE DATA TO BE REGISTERED SUCH THAT DYNAMIC REGISTRATION OF THE DYNAMICALLY GENERATED CODE AND THE CORRESPONDING UNWIND INFORMATION IS ENABLED
204

↓

RETURN

DYNAMIC REGISTRATION OF DYNAMICALLY GENERATED CODE AND CORRESPONDING UNWIND INFORMATION

TECHNICAL FIELD

The present claimed invention relates to dynamically generated code and call stack unwinding. More specifically, the present claimed invention relates to the registering of unwind information for corresponding dynamically generated code.

BACKGROUND ART

Code instrumentation is a method for analyzing and evaluating program code performance. In one approach to code instrumentation, new instructions (or probe code) are added to the program, and, consequently, the original code in the program is changed and/or relocated. Some examples of probe code include adding values to a register, moving the content of one register to another register, moving the address of some data to some registers, etc. The changed and/or relocated code is referred to as instrumented code or, more generally, as an instrumented process. For purposes of the present discussion, instrumented code is one type of dynamically generated code. Although the following discussion explicitly recites and discusses code instrumentation, such discussion and examples are for illustration only. That is, the following discussion also applies to various other types of dynamically generated code such as, for example, dynamically compiled Java byte code.

One specific type of code instrumentation is referred to as dynamic binary instrumentation. Dynamic binary instrumentation allows program instructions to be changed on-the-fly. Measurements such as basic-block coverage and function invocation counting can be accurately determined using dynamic binary instrumentation. Additionally, dynamic binary instrumentation, as opposed to static instrumentation, is performed at run-time of a program and only instruments those parts of an executable that are actually executed. This minimizes the overhead imposed by the instrumentation process itself. Furthermore, performance analysis tools based on dynamic binary instrumentation require no special preparation of an executable such as, for example, a modified build or link process.

Unfortunately, dynamic binary instrumentation does have some disadvantages associated therewith. For example, because the binary code of a program is modified when using dynamic binary instrumentation methods, all interactions with the processor and operating system may change significantly, for example a program's cache and paging behavior. As a result, dynamic binary instrumentation is considered to be intrusive. Also, due to the additional instructions introduced by dynamic binary instrumentation, process execution time can slow to anywhere from some small amount of increased run time to multiples of the run time of the non-instrumented process.

In one approach, dynamic binary instrumentation is performed in an in-line manner. That is, probe code is inserted into a code stream of interest. As a result, existing code must be relocated to new memory space because of increase in size of the original code stream due to the addition of probe code instructions. As compared to out-of-line approaches, an in-line approach leads to more compact code, less intrusion, and better performance. That is, in a typical out-of-line approach, a function's entry point is instrumented with a long branch to a trampoline that executes the instruction plus additional code related to the instrumentation taking place. In the in-line approach, such long branching to the trampoline is avoided. However, an in-line strategy does have drawbacks. For example, the insertion of probe code changes the relative offsets in a code stream and requires lookup of indirect branches (e.g. in a translation table) whose target cannot be determined by the instrumentor. Also, combining different instrumentations and probe code is not as easy as it is in certain out-of-line approaches.

One drawback associated with in-line instrumented processes is particularly troublesome. Namely, it is often necessary to unwind the call stack. For example, such an unwinding step in necessary when a C++ exception is thrown in a C++ application. Furthermore, in certain architectures such as, for example, an IA-64 architecture by Intel Corporation of Santa Clara, Calif., the runtime architecture uses unwind information to perform the task of stack unwinding. As mentioned above, during in-line instrumentation, the insertion of probe code changes the relative offsets in a code stream. As a result, unwind descriptors that were generated by the compiler for the original function may not match the instrumented function to be unwound due to the insertion of the probe code. As a result, standard stack unwinding mechanisms will fail. Mainly, the unwind process will fail because the unwind mechanism can no longer find the corresponding unwind information for dynamically generated code. Therefore, in one approach, the unwind descriptors for the instrumented function must either be updated or new unwind descriptors must be generated. In one attempt to resolve this issue, pseudo-modules have been created. These pseudo-modules contain data about the dynamically generated code (e.g. the instrumented code) and the corresponding unwind information. The pseudo-modules are utilized by the software component seeking to register an instrumented function along with its unwind information. This registration, enabled by the pseudo-modules, in a centralized place allows easy and effective synchronization and eliminates the need to update unwind tables.

The above-described use of pseudo-modules does have certain complications associated therewith. Specifically, the use of the pseudo-modules must occur within the context of the target application (i.e. the instrumented application/process which is being unwound). Because this target application is not recompiled or relinked in any special way, there is no direct support for the use of the pseudo-modules.

Thus, a need has arisen for a method and system for enabling the registration of dynamically generated code and its corresponding unwind information. Still another need exists for a method and system which meets the above need and which accommodates the use of pseudo-modules in the registration of the dynamically generated code and its corresponding unwind information.

DISCLOSURE OF THE INVENTION

The present invention provides a method and system for enabling the registration of dynamically generated code and its corresponding unwind information. The present invention further provides a method and system which achieves the above accomplishment and which accommodates the use of pseudo-modules in the registration of the dynamically generated code and its corresponding unwind information.

Specifically, in one method embodiment, the present invention creates a module which includes data related to dynamically generated code and corresponding unwind information. The present embodiment also provides an application program interface which allows the data to be registered such that dynamic registration of the dynamically generated code and the corresponding unwind information is enabled.

In another embodiment, the present invention provides a method for registering dynamically generated code and corresponding unwind information. In one such embodiment, the present invention creates a module which includes data related to dynamically generated code and corresponding unwind information. The present embodiment also provides an application program interface which allows the data to be registered such that dynamic registration of the dynamically generated code and the corresponding unwind information is enabled. The present embodiment also couples an application program interface invocation code sequence to the dynamically generated code such that upon execution of the dynamically generated code, the application program interface invocation code sequence instructs the application program interface to facilitate registration of the data.

These and other technical advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODES FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "providing", "coupling", "creating", "registering" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Computer System Environment of the Present Invention

Figure 1:
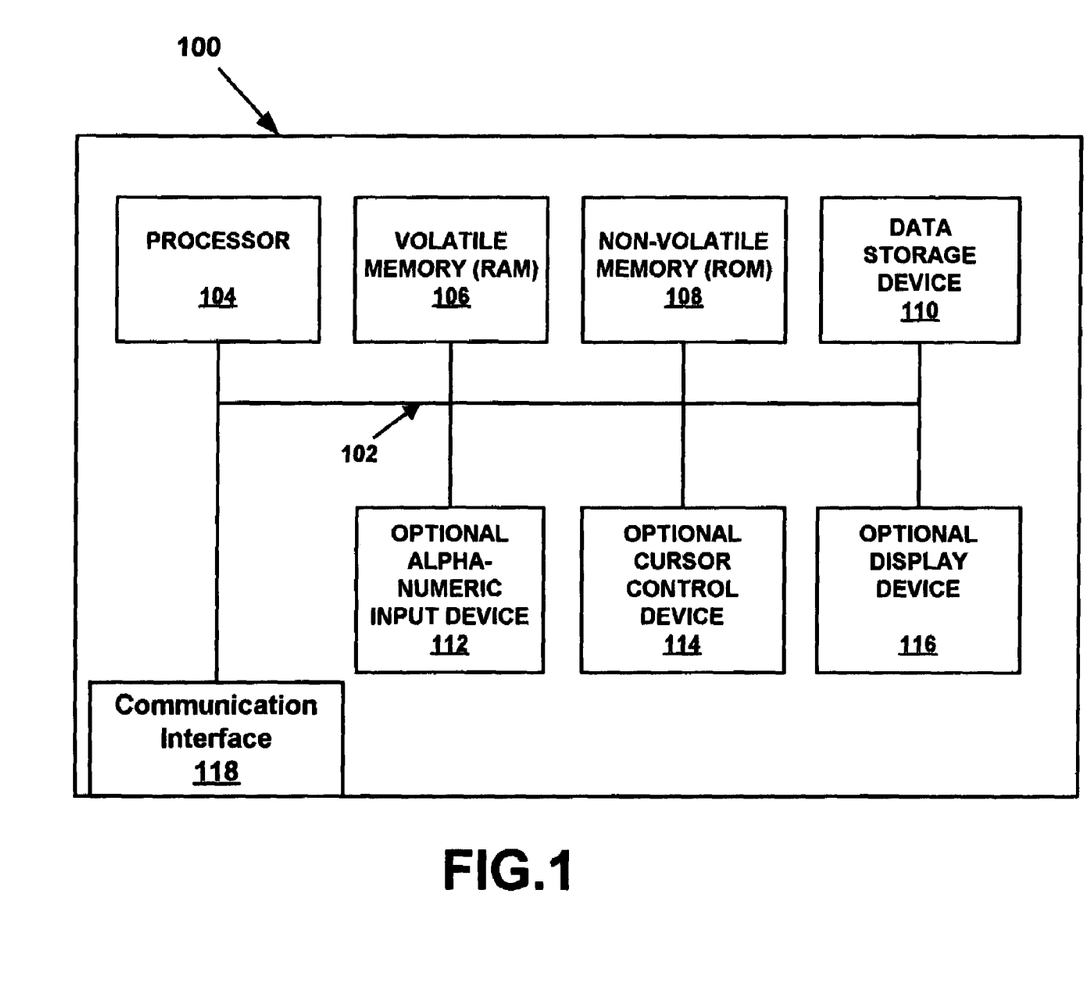
FIG. 1 is a schematic diagram of an exemplary computer system used to perform steps of the present method in accordance with various embodiments of the present claimed invention.

With reference now to FIG. 1, portions of the present method and system are comprised of computer-readable and computer-executable instructions which reside, for example, in computer-usable media of a computer system. FIG. 1 illustrates an exemplary computer system 100 used in accordance with one embodiment of the present invention. It is appreciated that system 100 of FIG. 1 is exemplary only and that the present invention can operate on or within a number of different computer systems including general purpose networked computer systems, embedded computer systems, routers, switches, server devices, client devices, various intermediate devices/nodes, stand alone computer systems, and the like. Additionally, computer system 100 of FIG. 1 is well adapted having computer readable media such as, for example, a floppy disk, a compact disc, and the like coupled thereto. Such computer readable media is not shown coupled to computer system 100 in FIG. 1 for purposes of clarity. Additionally, portions of the present embodiment are well suited to operating in conjunction with various mobile clients such as, for example, a cell phone, personal digital assistant (PDA), laptop computer, pager, and the like.

System 100 of FIG. 1 includes an address/data bus 102 for communicating information, and a central processor unit 104 coupled to bus 102 for processing information and instructions. As an example, central processor unit 104 may be an IA-64 architecture processor available from Intel Corporation of Santa Clara, Calif. System 100 also includes data storage features such as a computer usable volatile memory 106, e.g. random access memory (RAM), coupled to bus 102 for storing information and instructions for central processor unit 104. System 100 also includes computer usable non-volatile memory 108, e.g. read only memory (ROM), coupled to bus 102 for storing static information and instructions for the central processor unit 104. Such static information is comprised, in one embodiment, of commands for configuration and initial operations of computer system 100. Computer system 100 also includes a data storage unit 110 (e.g., a magnetic or optical disk and disk drive) coupled to bus 102 for storing information and instructions.

System 100 of the present invention also includes an optional alphanumeric input device 112 including alphanumeric and function keys coupled to bus 102 for communicating information and command selections to central processor unit 104. System 100 also optionally includes an optional cursor control device 114 coupled to bus 102 for communicating user input information and command selections to central processor unit 104. System 100 of the present embodiment also includes an optional display device 116 coupled to bus 102 for displaying information. System 100 of the present embodiment also includes a communication interface 118 which enables computer system 100 to interface with other computers or devices. In one embodiment, communication 118 is, for example, a modem, an integrated services digital network (ISDN) card or the like, a local area network (LAN) port, etc. Those skilled in the art will recognize that modems or various types of network interface cards (NICs) typically provide data communications via telephone lines, while a LAN port provides data communications via a LAN. Communication interface 118 of computer system 100 may also enable wireless communications. Furthermore, communication interface 118 may enable communication with other computers or devices through one or more networks. For example, computer system 100, using communication interface 118, may communicate to the "Internet."

Computer system 100 may be used to implement the techniques described below. In various embodiments, processor 104 performs the steps of the techniques by executing instructions brought to RAM 106. In alternative embodiments, hard-wired circuitry may be used in place of or in combination with software instructions to implement the described techniques. Consequently, embodiments of the invention are not limited to any one or a combination of software, hardware, or circuitry.

Instructions executed by processor 104 may be stored in and carried through one or more computer-readable media, which refer to any medium from which a computer reads information. Computer-readable media may be, for example, a floppy disk, a hard disk, a zip-drive cartridge, a magnetic tape, or any other magnetic medium, a CD-ROM, a CD-RAM, a DVD-ROM, a DVD-RAM, or any other optical medium, paper-tape, punch-cards, or any other physical medium having patterns of holes, a RAM, a ROM, an EPROM, or any other memory chip or cartridge. Computer-readable media may also be coaxial cables, copper wire, fiber optics, acoustic, or light waves, etc. As an example, the instructions to be executed by processor 104 are in the form of one or more software programs and are initially stored in a CD-ROM being interfaced with computer system 100. Computer system 100 loads these instructions in RAM 106, executes some instructions, and sends some instructions via communication interface 118, a modem, and a telephone line to a network, the Internet, etc. A remote computer, receiving data through a network cable, executes the received instructions and sends the data to computer system 100 to be stored in storage device 110.

Referring still to FIG. 1, optional display device 116 of FIG. 1, may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well suited to directing a cursor by other means such as, for example, voice commands. A more detailed discussion of the present invention is found below.

General Method and System for the Dynamic Registration of Instrumental Code and Corresponding Unwind Information As an overview, the present invention provides a method and system for enabling the registration of dynamically generated code and corresponding unwind information.

Figure 2:
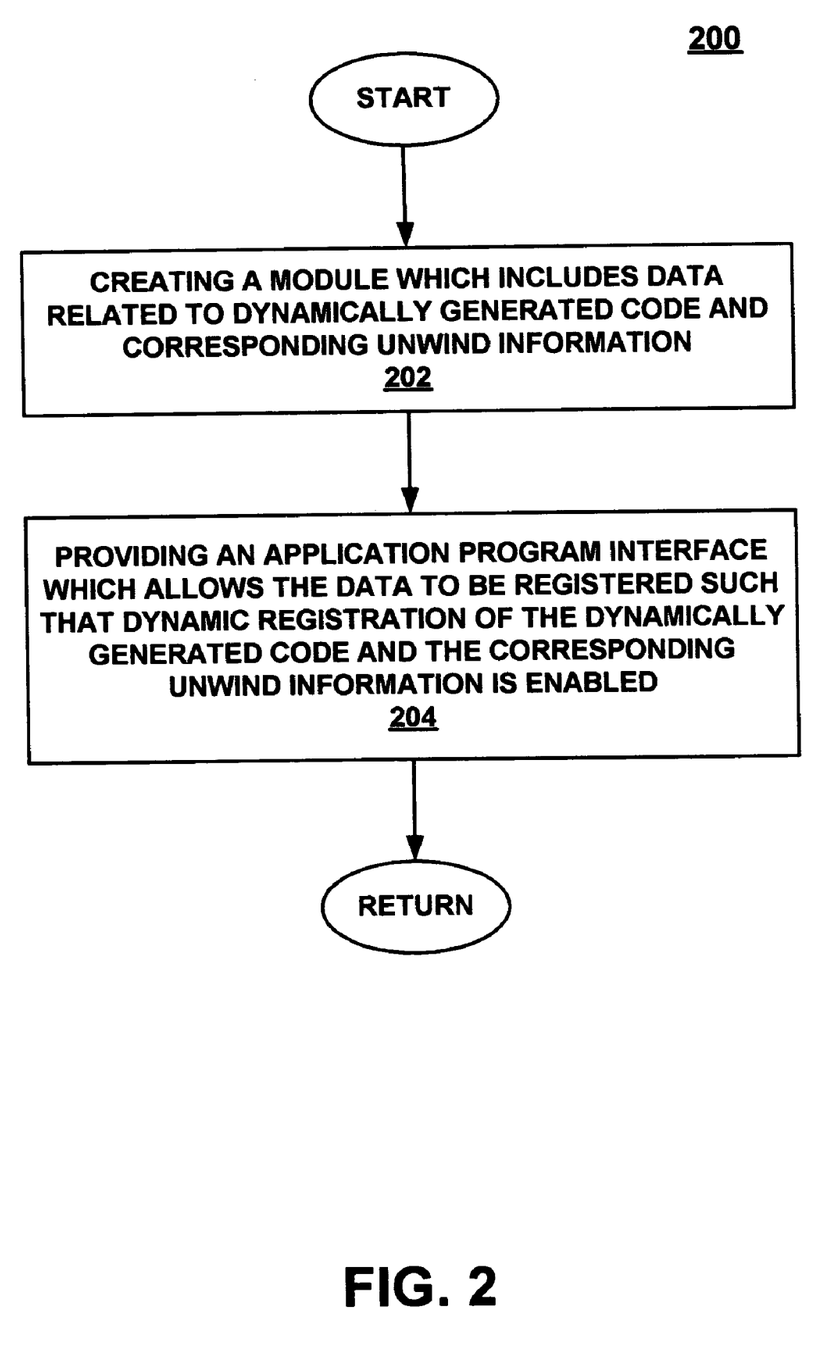
FIG. 2 is a flow chart of steps performed in accordance with one embodiment of the present claimed invention.

With reference next to flow chart 200 and to FIG. 1, exemplary steps used by the various embodiments of present invention are illustrated. Flow chart 200 includes processes of the present invention which, in one embodiment, are carried out by a processor under the control of computer-readable and computer-executable instructions. The computer-readable and computer-executable instructions reside, for example, in data storage features such as computer usable volatile memory 106, computer usable non-volatile memory 108, and/or data storage device 110 of FIG. 1. In one embodiment, the computer-readable and computer-executable instructions are used to control or operate in conjunction with, for example, processor 104 of FIG. 1.

Figure 3:
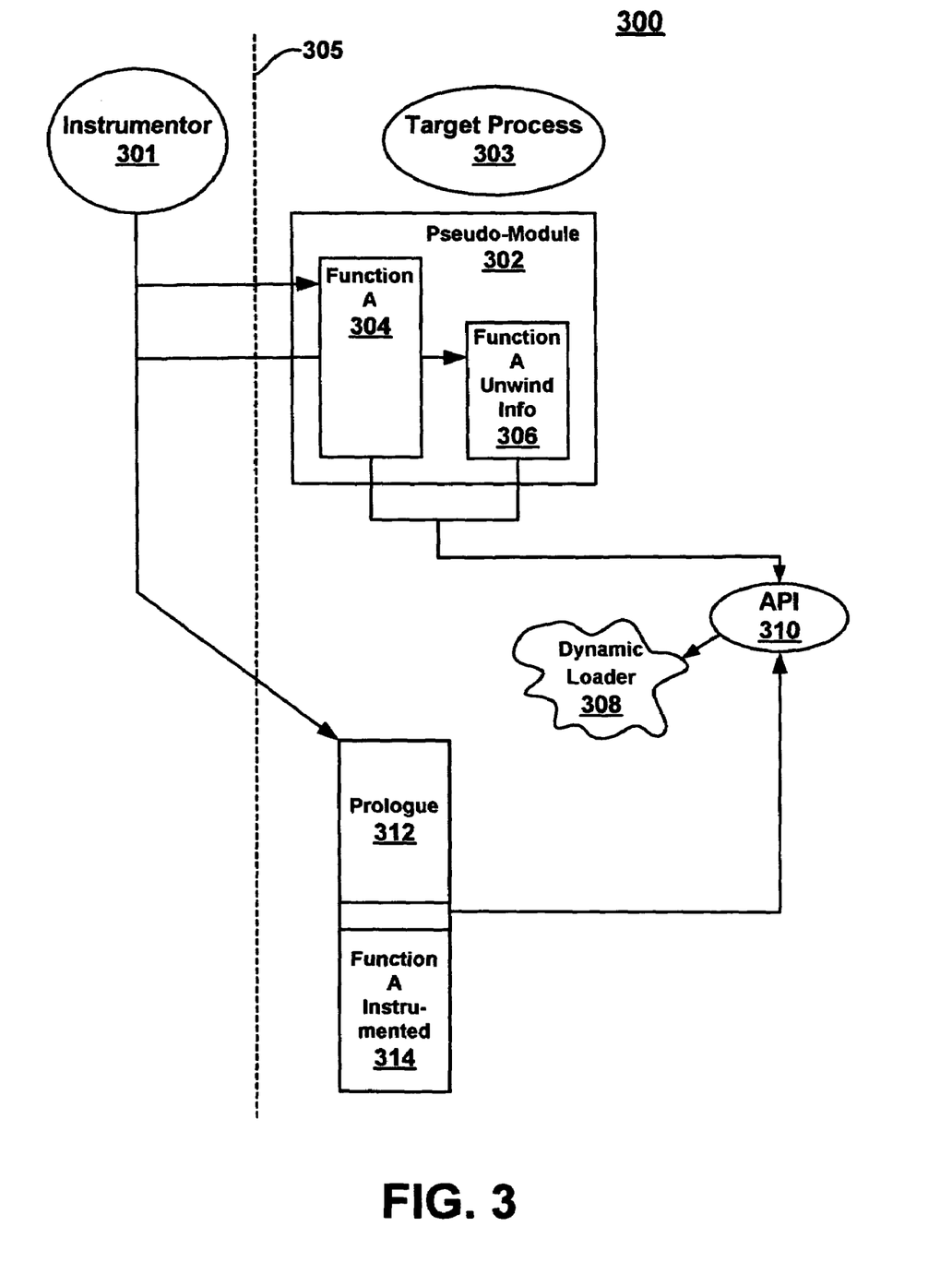
FIG. 3 is a schematic diagram of a system in which the present embodiments are implemented in accordance with one embodiment of the present claimed invention.

With reference again to FIG. 2, steps performed in accordance with one embodiment of the present invention are shown. Although specific steps are disclosed in flow chart 200 of FIG. 2, such steps are exemplary. That is, the present invention is well suited to performing various other steps or variations of the steps recited in FIG. 2. The steps of the various embodiments of the present invention will also be described in conjunction with the schematic diagram of a system 300, in which the present embodiments may be employed, shown in FIG. 3. FIG. 3 depicts a dynamic code generation system such as, for example, an instrumentor 301, a target process environment 303 and a logical dividing line 305. At step 202, the present embodiment creates a module 302 which includes data related to dynamically generated code and corresponding unwind information. In one embodiment, the dynamically generated code is comprised of an instrumented version of a function. For purposes of the present discussion, instrumented code is used as an example of one type of dynamically generated code. Although the following discussion explicitly recites and discusses code instrumentation, such discussion and examples are for illustration only. That is, the following embodiments of the present invention also pertain to various other types of dynamically generated code. Additional details related to instrumentation can be found in co-owned, commonly-assigned U.S. patent application Ser. No. 09/833, 248 filed Apr. 11, 2001, entitled "Dynamic Instrumentation Of An Executable Program", to Hundt et al. which is incorporated herein by reference as background material.

Referring still to step 202, and to FIG. 3, in one embodiment, module 302 is comprised of pseudo-module having data related to a process, e.g. Function A 304 and corresponding Function A Unwind Information 306. In the present embodiment, pseudo-module 302 is used to register an instrumented function along with its unwind information. That is, pseudo-module 302 stores data related to dynamically generated code (e.g. Function A 304) and its corresponding unwind information (e.g. Function A Unwind Information 306) in a centralized location. Furthermore, in one embodiment, processor 104 of FIG. 1 in conjunction with instructions, residing, for example, in RAM 106, ROM 108, and/or data storage device 110, comprise an apparatus which operates to perform step 202.

With reference now to step 204, the present embodiment provides an application program interface (API) 310 which allows the data (e.g. Function A 304 and Function A Unwind Information 306) within pseudo-module 302 to be registered such that dynamic registration of dynamically generated code and its corresponding unwind information is enabled. In one embodiment, a dynamic loader 308 is used in conjunction with API 310 to register the data within pseudo-module 302. More specifically, the use of the pseudo-modules 302 must occur within the context (e.g. to the right of line 305) of the target application (i.e. the instrumented application/process 303 which is being unwound). In prior art approaches, because this target application is not recompiled or relinked in any special way, there was no direct support for the use of the pseudo-modules. The present embodiment, however, provides API 310 which now enables, for example, dynamic loader 308 to register the data within pseudo-module 302.

Hence, the present embodiment provides a method and system for enabling the registration of dynamically generated code and its corresponding unwind information. The present invention further provides a method and system which achieves the above accomplishment and which accommodates the use of pseudo-modules in the registration of the dynamically generated code and its corresponding unwind information. Also, in one embodiment, processor 104 of FIG. 1 in conjunction with instructions residing, for example, in RAM 106, ROM 108, and/or data storage device 110 comprise an apparatus which operates to perform step 204.

Figure 4:
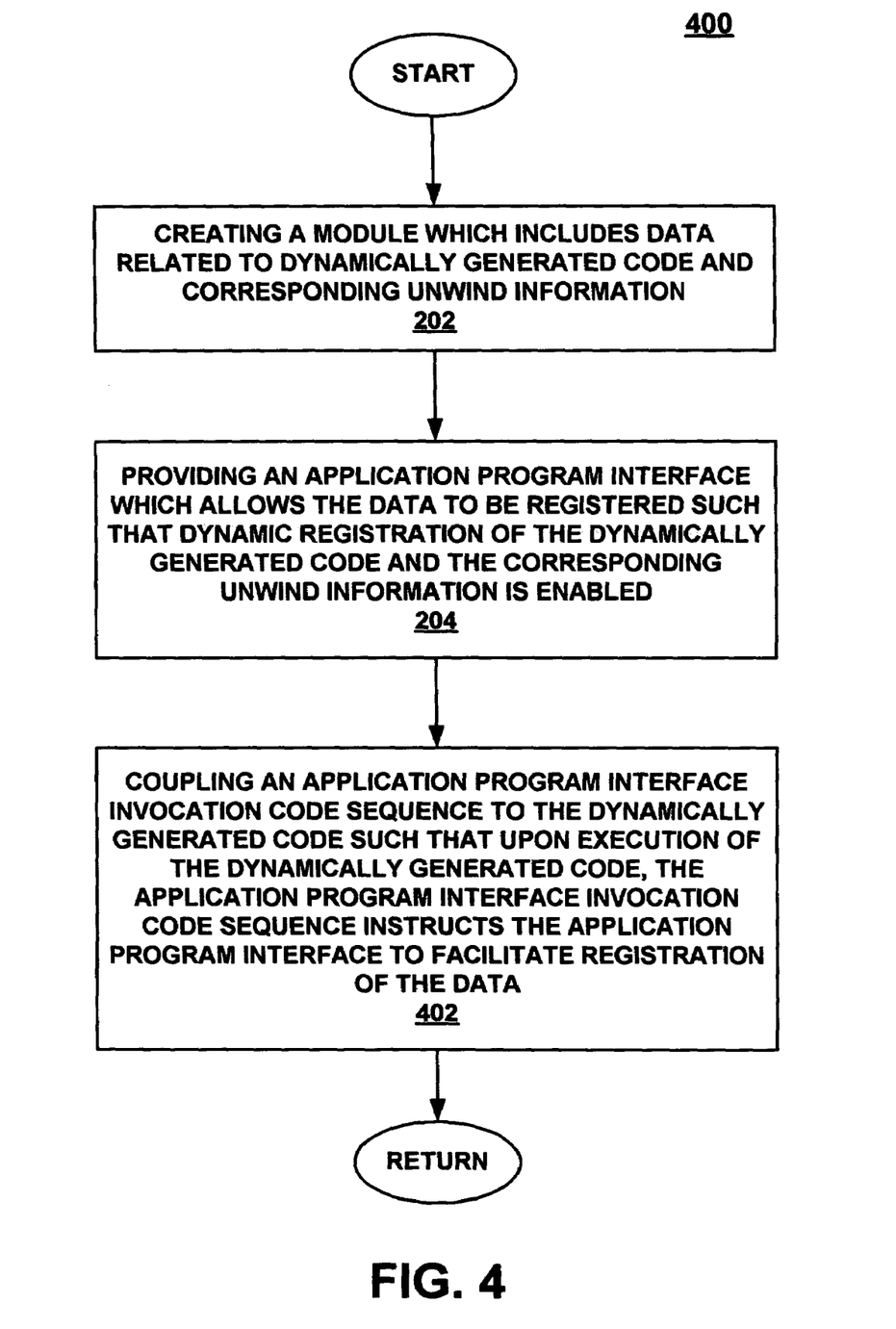
FIG. 4 is a flow chart of steps performed in accordance with another embodiment of the present claimed invention.

With reference now to FIG. 4, a flow chart 400 of steps performed in accordance with an embodiment of the present invention for registering dynamically generated code and corresponding unwind information is shown. The method of the present embodiment includes steps 202 and 204 of FIG. 2. These steps were described above in detail in conjunction with the description of FIG. 2, and are not repeated herein for purposes of brevity and clarity. The method of the present embodiment as described in FIG. 4 also includes new step 402. At step 402, the present embodiment couples an application program interface invocation code sequence (e.g. prologue 312) to the dynamically generated code 314 such that upon execution of dynamically generated code 314, the application program interface invocation code sequence, prologue 312, instructs API 310 to facilitate registration of data within pseudo-module 302.

Figure 5:
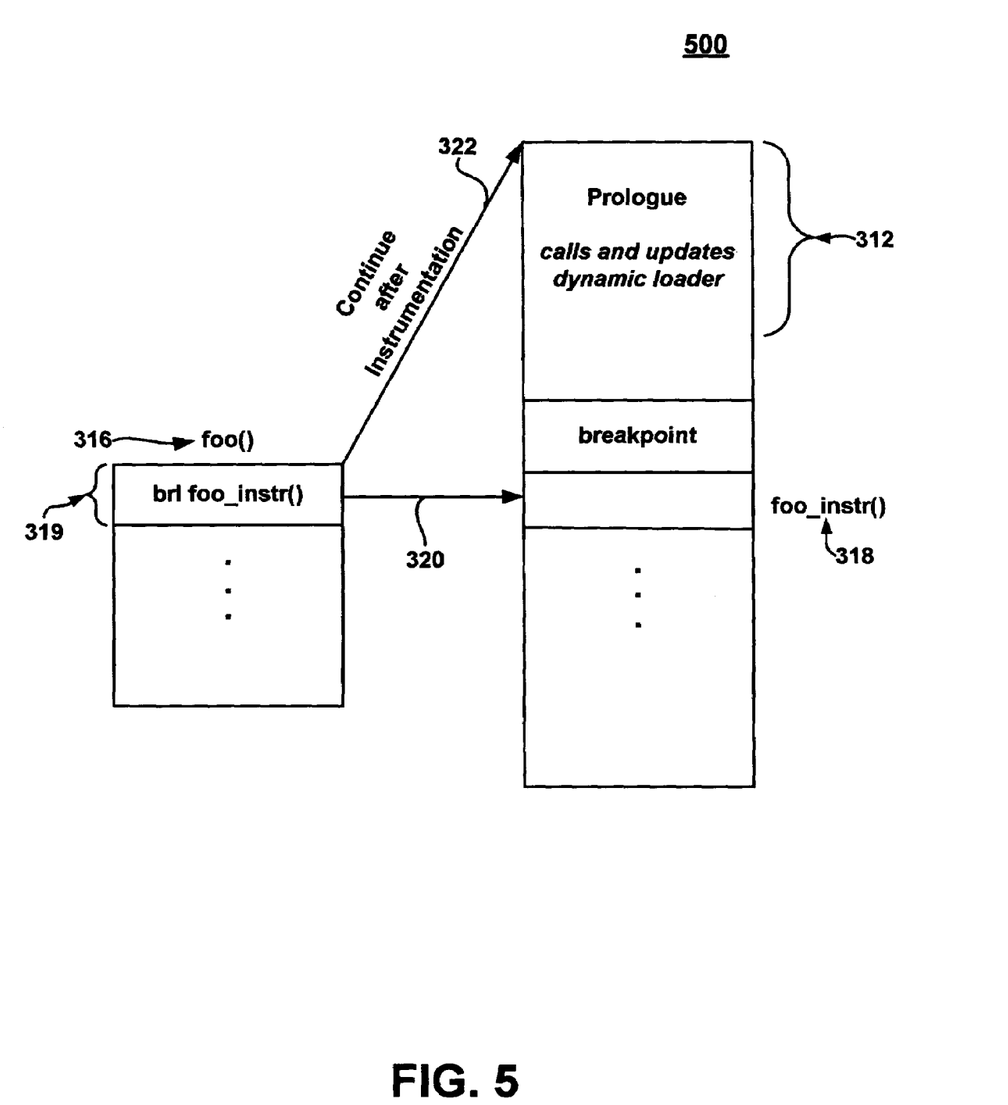
FIG. 5 is a schematic diagram of the code layout and control transfer for an application program interface invocation code sequence in accordance with one embodiment of the present claimed invention.

With reference still to step 402 and also now to FIG. 5, a schematic diagram 500 of the code layout and control transfer for the function prologue 312 (i.e. the application program interface invocation code sequence) of FIG. 3 is shown. In one embodiment, after instrumentation of a function, the original function's entry point is patched with a long branch to the instrumented function's entry point, which is located after prologue 312. More specifically, in the embodiment of FIG. 5, function foo ( ) 316 is instrumented to produce instrumented function foo_instr( ) 318. Thereafter, the entry point of original function foo ( ) 316 is patched with a long branch 319 (depicted by arrow 320) to the entry point of instrumented function foo_instr( ) 318. To continue the target executable, the instruction pointer (IP) is set to the beginning of prologue 312 (see arrow 322). In so doing, the present embodiment assures that prologue 312 is executed just once. Hence, in on embodiment, prologue code 312 will be executed only once per instrumented function and will perform the necessary registration calls to dynamic loader 308 via API 310.

With reference still to step 402 of FIG. 4, the application program interface invocation code sequence (e.g. prologue 312 of FIG. 3 and FIG. 5) consists of about 80 bundles. Additional details related to bundles can be found in co-owned, commonly-assigned U.S. patent application Ser. No. 09/833,248 filed Apr. 11, 2001, entitled "Dynamic Instrumentation Of An Executable Program", to Hundt et al. which has already been incorporated by reference as background material. As a result, generating prologue 312 for every function results in significant code bloat for instrumented functions. Hence, in one embodiment of the present invention, the application program interface invocation code sequence (e.g. prologue 312) is utilized by second dynamically generated code. That is, one embodiment of the present invention reuses the space allocated for prologue 312 for all function registrations. In so doing, the present embodiment prevents code bloat which could occur if numerous prologues were used. It should be noted that although the present embodiment uses the same space to store prologue 312, the instruction sequence of prologue 312 will be different for each function to be registered. The above-described approach to using the same allocated prologue space for a second approach is particularly beneficial in single-threaded processes. Also, in one embodiment, processor 104 of FIG. 1 in conjunction with instructions residing, for example, in RAM 106, ROM 108, and/or data storage device 110 comprise an apparatus which operates to perform step 402.

Figure 6:
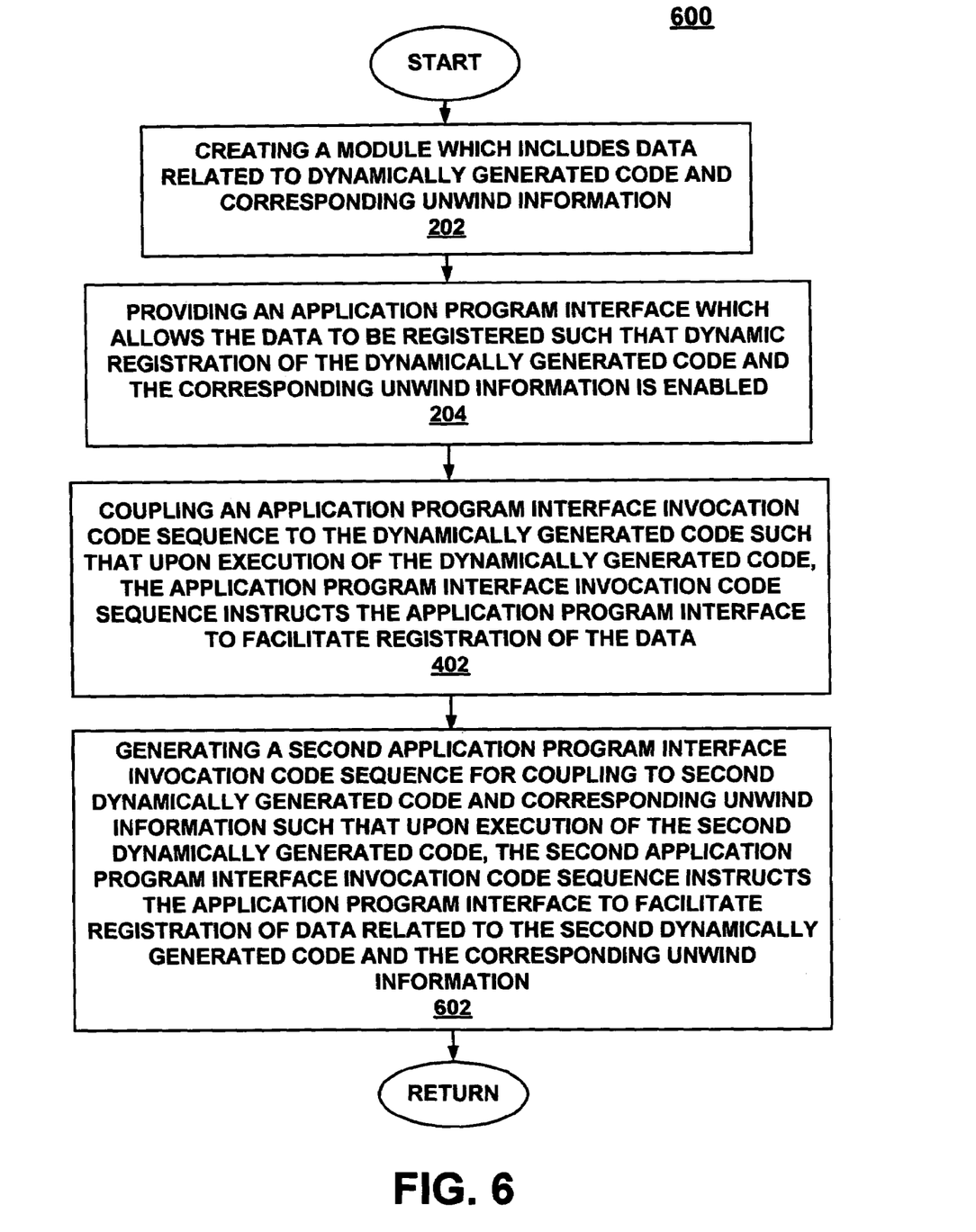
FIG. 6 is a flow chart of steps performed in accordance with yet another embodiment of the present claimed invention.

With reference now to FIG. 6, a flow chart 600 of steps performed in accordance with an embodiment of the present invention for registering dynamically generated code and corresponding unwind information is shown. The method of the present embodiment includes steps 202, 204, and 402 of FIG. 4. These steps were described above in detail in conjunction with the description of FIGS. 2 and 4, and are not repeated herein for purposes of brevity and clarity. The method of the present embodiment as described in FIG. 6 also includes new step 602. At step 602, the present embodiment generates a second application program interface invocation code sequence for coupling to second dynamically generated code and corresponding unwind information. In so doing, upon execution of the second dynamically generated code, the second application program interface invocation code sequence instructs the application program interface to facilitate registration of data related to the second dynamically generated code and the corresponding unwind information. More generally, the present embodiment creates a new and distinct prologue for each thread of a multi-threaded process.

Referring still to step 602, by providing a separate prologue for each of the threads in a multi-threaded process, the present embodiment prevents the generation of a race condition. As an example, consider a multi-threaded environment where Thread A is executing a prologue for a reached and instrumented function foo( ). Another Thread B reaches an uninstrumented function bar( ). Without employing the present embodiment, the instrumentor would instrument bar( ), and then proceed to overwrite the prologue region which is still needed by Thread A (i.e. a race condition is generated). The present embodiment, however, provides a first prologue for Thread A and a second prologue for Thread B, thereby preventing the generation of such a race condition. In one embodiment, processor 104 of FIG. 1 in conjunction with instructions residing, for example, in RAM 106, ROM 108, and/or data storage device 110 comprise an apparatus which operates to perform step 602.

Figure 7:
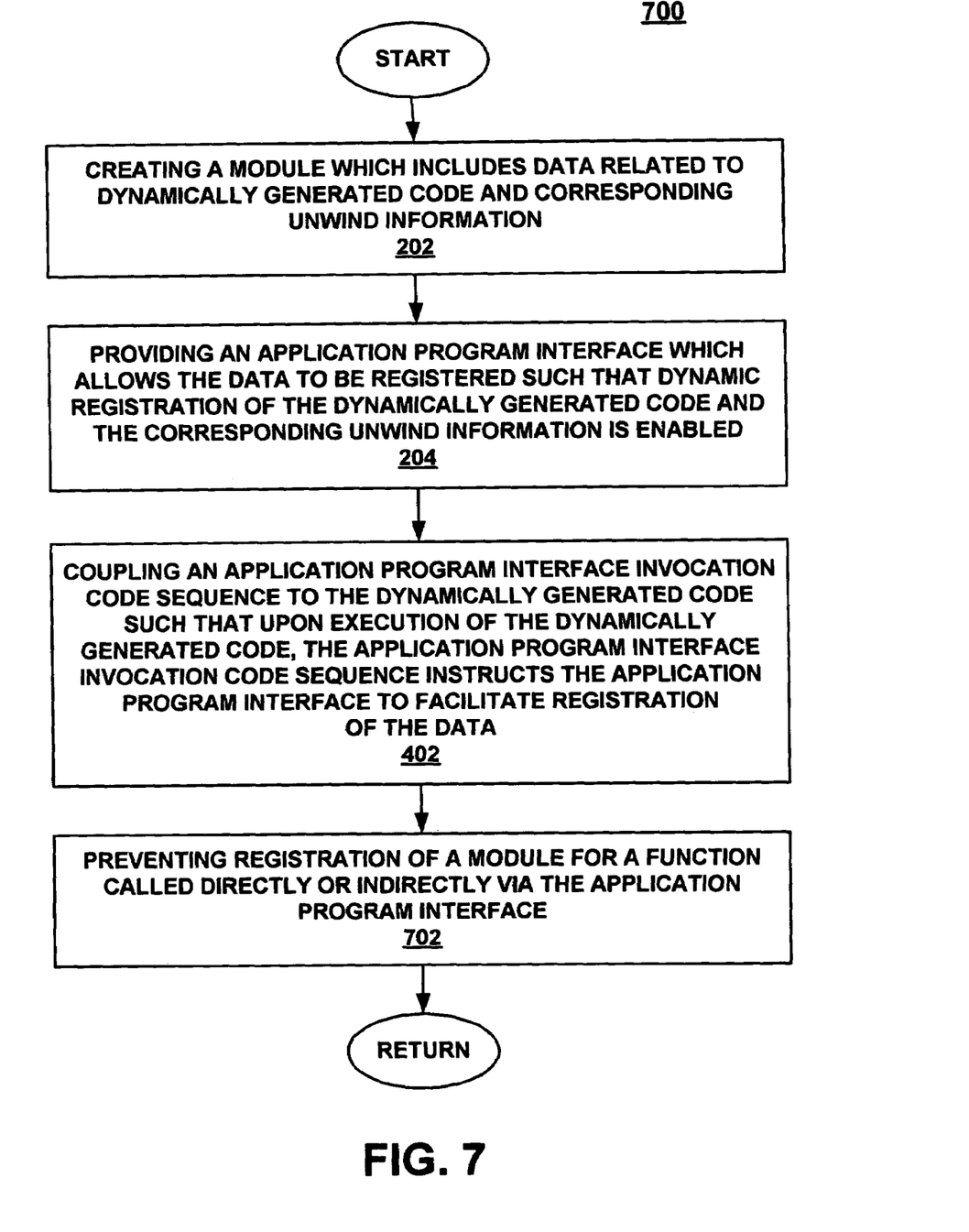
FIG. 7 is a flow chart of steps performed in accordance with still another embodiment of the present claimed invention.

With reference now to FIG. 7, a flow chart 700 of steps performed in accordance with still another embodiment of the present invention for registering dynamically generated code and corresponding unwind information is shown. The method of the present embodiment includes steps 202, 204, and 402 of FIG. 4. These steps were described above in detail in conjunction with the description of FIGS. 2 and 4, and are not repeated herein for purposes of brevity and clarity. The method of the present embodiment as described in FIG. 7 also includes new step 702. At step 702, the present embodiment prevents registration of a module (e.g. pseudo-module 302) for the function called directly or indirectly via the application program interface 310 of FIG. 3.

With reference still to step 702, by preventing the registration of pseudo-modules for the function called directly or indirectly via the application program interface 310 of FIG. 3, the present embodiment prevents recursive overwriting of the prologue. In one embodiment, processor 104 of FIG. 1 in conjunction with instructions residing, for example, in RAM 106, ROM 108, and/or data storage device 110 comprise an apparatus which operates to perform step 702.

Figure 8:
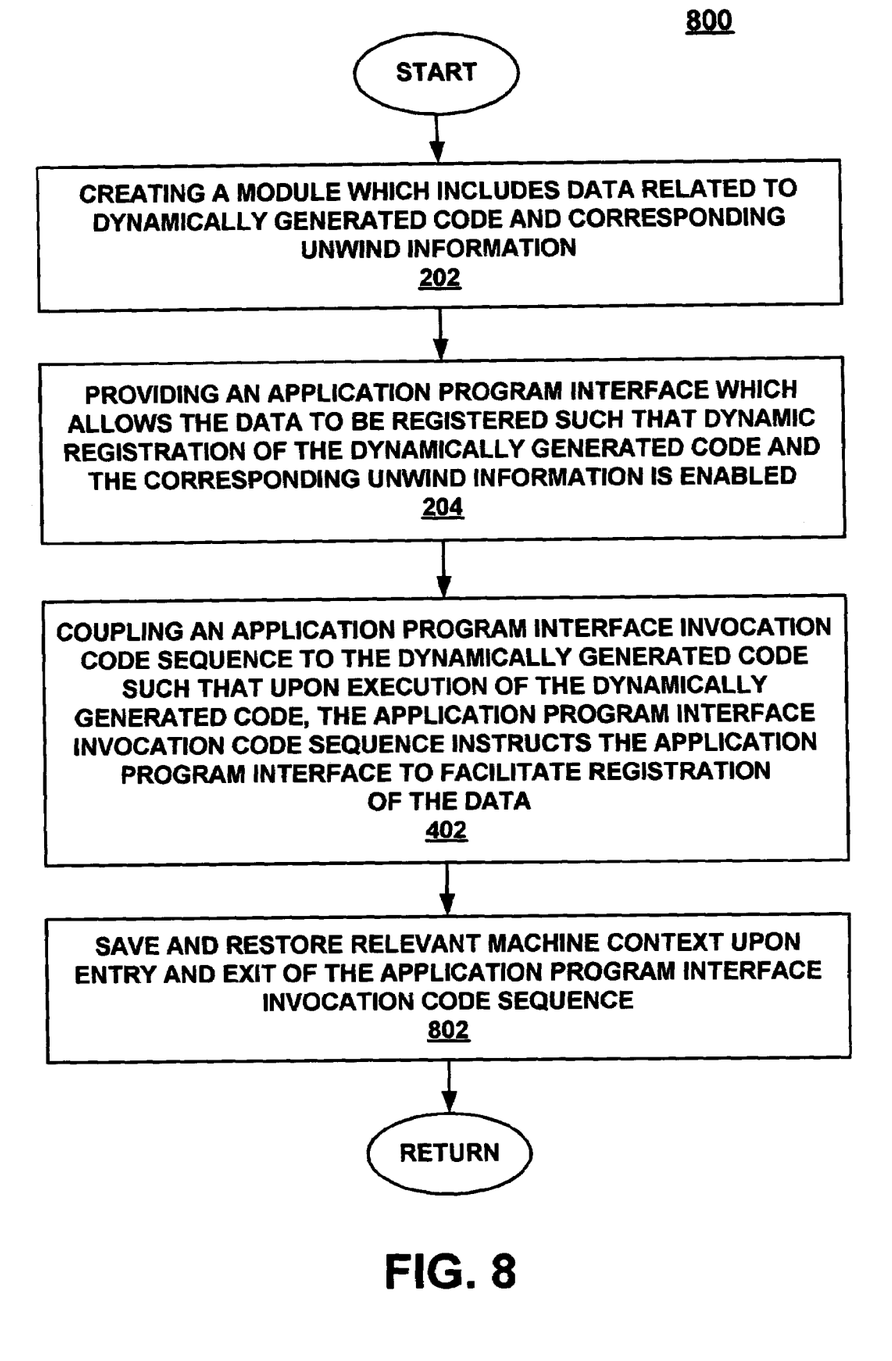
FIG. 8 is a flow chart of steps performed in accordance with yet another embodiment of the present claimed invention.

With reference now to FIG. 8, a flow chart 800 of steps performed in accordance with yet another embodiment of the present invention for registering dynamically generated code and corresponding unwind information is shown. The method of the present embodiment includes steps 202, 204, and 402 of FIG. 4. These steps were described above in detail in conjunction with the description of FIGS. 2 and 4, and are not repeated herein for purposes of brevity and clarity. The method of the present embodiment as described in FIG. 8 also includes new step 802. At step 802, the present embodiment saves and restores the relevant machine context upon entry and exit of the application program interface invocation code sequence.

That is, at step 802, in the present embodiment upon entry and exit of prologue 312, saves and restores the relevant context of the target process (e.g. preserved registers must preserve their values across the invocation of the application program interface invocation code sequence). In so doing, correct context information for the target process is maintained in spite of the execution of prologue 312. Also, in one embodiment, processor 104 of FIG. 1 in conjunction with instructions residing, for example, in RAM 106, ROM 108, and/or data storage device 110 comprise an apparatus which operates to perform step 802.

The embodiments recited in conjunction with steps 602, 702, and 802 of FIGS. 6, 7, and 8, respectively, were each described above separately, for purposes of clarity. It should be understood, however, that the present invention is also well suited to an embodiment which performs more than one or all of steps 602, 702, and 802 in combination.

Thus, the present invention provides a method and system for enabling the registration of dynamically generated code and its corresponding unwind information. The present invention further provides a method and system which achieves the above accomplishment and which accommodates the use of pseudo-modules in the registration of the dynamically generated code and its corresponding unwind information.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer-implemented method for enabling the registration of dynamically generated code and corresponding unwind information, said method comprising:

creating a module which includes data related to said dynamically generated code and said corresponding unwind information, said dynamically generated code comprising instrumented code for a function;

providing an application program interface which allows said data to be registered such that dynamic registration of said dynamically generated code and said corresponding unwind information is enabled;

patching an entry point of said function to an entry point of said instrumented code; and setting an instruction pointer to the beginning of an application program interface invocation code sequence that precedes said entry point of said instrumented code.

2. The computer-implemented method for enabling the registration of dynamically generated code and corresponding unwind information as recited in claim 1 wherein said module stores said data related to said dynamically generated code and said corresponding unwind information in a centralized location.

3. The computer-implemented method for enabling the registration of dynamically generated code and corresponding unwind information as recited in claim 1 wherein said application program interface allows said data to be registered by a dynamic loader.

4. A computer-readable storage medium embodying instructions that cause a computer to perform a method for enabling the registration of dynamically generated code and corresponding unwind information, said method comprising:

creating a module which includes data related to said dynamically generated code and said corresponding unwind information, said dynamically generated code comprising instrumented code for a function;

providing an application program interface which allows said data to be registered such that dynamic registration of said dynamically generated code and said corresponding unwind information is enabled;

patching an entry point of said function to an entry point of said instrumented code; and setting an instruction pointer to the beginning of an application program interface invocation code sequence that precedes said entry point of said instrumented code.

5. The computer-readable storage medium of claim 4 wherein said module stores said data related to said dynamically generated code and said corresponding unwind information in a centralized location.

6. The computer-readable storage medium of claim 4 wherein said application program interface allows said data to be registered by a dynamic loader.

7. An apparatus for enabling the registration of dynamically generated code and corresponding unwind information, the apparatus comprising:
   means for creating a module which includes data related to said dynamically generated code and said corresponding unwind information, said dynamically generated code comprising instrumented code for a function;
   means for providing an application program interface which allows said data to be registered such that dynamic registration of said dynamically generated code and said corresponding unwind information is enabled;
   means for patching an entry point of said function to an entry point of said instrumented code; and
   means for setting an instruction pointer to the beginning of an application program interface invocation code sequence that precedes said entry point of said instrumented code.

8. The apparatus of claim 7 wherein said module stores said data related to said dynamically generated code and said corresponding unwind information in a centralized location.

9. The apparatus of claim 7 wherein said application program interface allows said data to be registered by a dynamic loader.

10. A computer-implemented method for registering dynamically generated code for a function and for registering corresponding unwind information, said method comprising:
    creating a module which includes data related to said dynamically generated code and said corresponding unwind information;
    providing an application program interface which allows said data to be registered such that dynamic registration of said dynamically generated code and said corresponding unwind information is enabled;
    coupling an application program interface invocation code sequence to said dynamically generated code such that upon execution of said dynamically generated code said application program interface invocation code sequence instructs said application program interface to facilitate registration of said data;
    patching an entry point of said function to an entry point associated with said dynamically generated code; and
    setting an instruction pointer to the beginning of said application program interface invocation code sequence.

11. The computer-implemented method for registering dynamically generated code and corresponding unwind information as recited in claim 10 wherein said module stores said data related to said dynamically generated code and said corresponding unwind information in a centralized location.

12. The computer-implemented method for registering dynamically generated code and corresponding unwind information as recited in claim 10 wherein said dynamically generated code is comprised of instrumented code.

13. The computer-implemented method for registering dynamically generated code and corresponding unwind information as recited in claim 10 wherein said application program interface allows said data to be registered by a dynamic loader.

14. The computer-implemented method for registering dynamically generated code and corresponding unwind information as recited in claim 10 wherein space for storing said application program interface invocation code sequence is reused for a second application program interface invocation code sequence for second dynamically generated code for a second function.

15. The computer-implemented method for registering dynamically generated code and corresponding unwind information as recited in claim 10 further comprising:
    generating a second application program interface invocation code sequence for coupling to second dynamically generated code and corresponding unwind information such that upon execution of said second dynamically generated code, said second application program interface invocation code sequence instructs said application program interface to facilitate registration of data related to said second dynamically generated code and said corresponding unwind information.

16. The computer-implemented method for registering dynamically generated code and corresponding unwind information as recited in claim 10 further comprising:
    preventing registration of said module for a function called directly or indirectly via said application program interface.

17. The computer-implemented method for registering dynamically generated code and corresponding unwind information as recited in claim 10 further comprising:
    saving and restoring register values upon entry and exit of said application program interface invocation code sequence.

18. A computer-readable storage medium embodying instructions that cause a computer to perform a method for registering dynamically generated code for a function and for registering corresponding unwind information, said method comprising:
    creating a module which includes data related to said dynamically generated code and said corresponding unwind information;
    providing an application program interface which allows said data to be registered such that dynamic registration of said dynamically generated code and said corresponding unwind information is enabled;
    coupling an application program interface invocation code sequence to said dynamically generated code such that upon execution of said dynamically generated code said application program interface invocation code sequence instructs said application program interface to facilitate registration of said data;
    patching an entry point of said function to an entry point associated with said dynamically generated code; and
    setting an instruction pointer to the beginning of said application program interface invocation code sequence.

19. The computer-readable storage medium of claim 18 wherein said module stores said data related to said dynamically generated code and said corresponding unwind information in a centralized location.

20. The computer-readable storage medium of claim 18 wherein said dynamically generated code is comprised of instrumented code.

21. The computer-readable storage medium of claim 18 wherein said application program interface allows said data to be registered by a dynamic loader.

22. The computer-readable storage medium of claim 18 wherein space for storing said application program interface invocation code sequence is reused for a second application program interface invocation code sequence for second dynamically generated code for a second function.

23. The computer-readable storage medium of claim 18 wherein said method further comprises:

generating a second application program interface invocation code sequence for coupling to second dynamically generated code and corresponding unwind information such that upon execution of said second dynamically generated code, said second application program interface invocation code sequence instructs said application program interface to facilitate registration of data related to said second dynamically generated code and said corresponding unwind information.

24. The computer-readable storage medium of claim 18 wherein said method further comprises:

preventing registration of said module for a function called directly or indirectly via said application program interface.

25. The computer-readable storage medium of claim 18 wherein said method further comprises:

saving and restoring register values upon entry and exit of said application program interface invocation code sequence.

26. An apparatus for registering dynamically generated code for a function and for registering corresponding unwind information, said apparatus comprising:

means for creating a module which includes data related to said dynamically generated code and said corresponding unwind information;

means for providing an application program interface which allows said data to be registered such that dynamic registration of said dynamically generated code and said corresponding unwind information is enabled;

means for coupling an application program interface invocation code sequence to said dynamically generated code such that upon execution of said dynamically generated code said application program interface invocation code sequence instructs said application program interface to facilitate registration of said data;

means for patching an entry point of said function to an entry point associated with said dynamically generated code; and means for setting an instruction pointer to the beginning of said application program interface invocation code sequence.

27. The apparatus of claim 26 wherein said module stores said data related to said dynamically generated code and said corresponding unwind information in a centralized location.

28. The apparatus of claim 26 wherein said dynamically generated code is comprised of instrumented code.

29. The apparatus of claim 26 wherein said application program interface allows said data to be registered by a dynamic loader.

30. The apparatus of claim 26 wherein space for storing said application program interface invocation code sequence is reused for a second application program interface invocation code sequence for second dynamically generated code for a second function.

31. The apparatus of claim 26 further comprising:

means for generating a second application program interface invocation code sequence for coupling to second dynamically generated code and corresponding unwind information such that upon execution of said second dynamically generated code, said second application program interface invocation code sequence instructs said application program interface to facilitate registration of data related to said second dynamically generated code and said corresponding unwind information.

32. The apparatus of claim 26 further comprising:

means for preventing registration of said module for a function called directly or indirectly via said application program interface.

33. The apparatus of claim 26 further comprising:

means for saving and restoring register values upon entry and exit of said application program interface invocation code sequence.

* * * * *